(No Model.)
G. W. NIEDRINGHAUS.
ENAMELED SHEET METAL WARE.
No. 503,247. Patented Aug. 15, 1893.
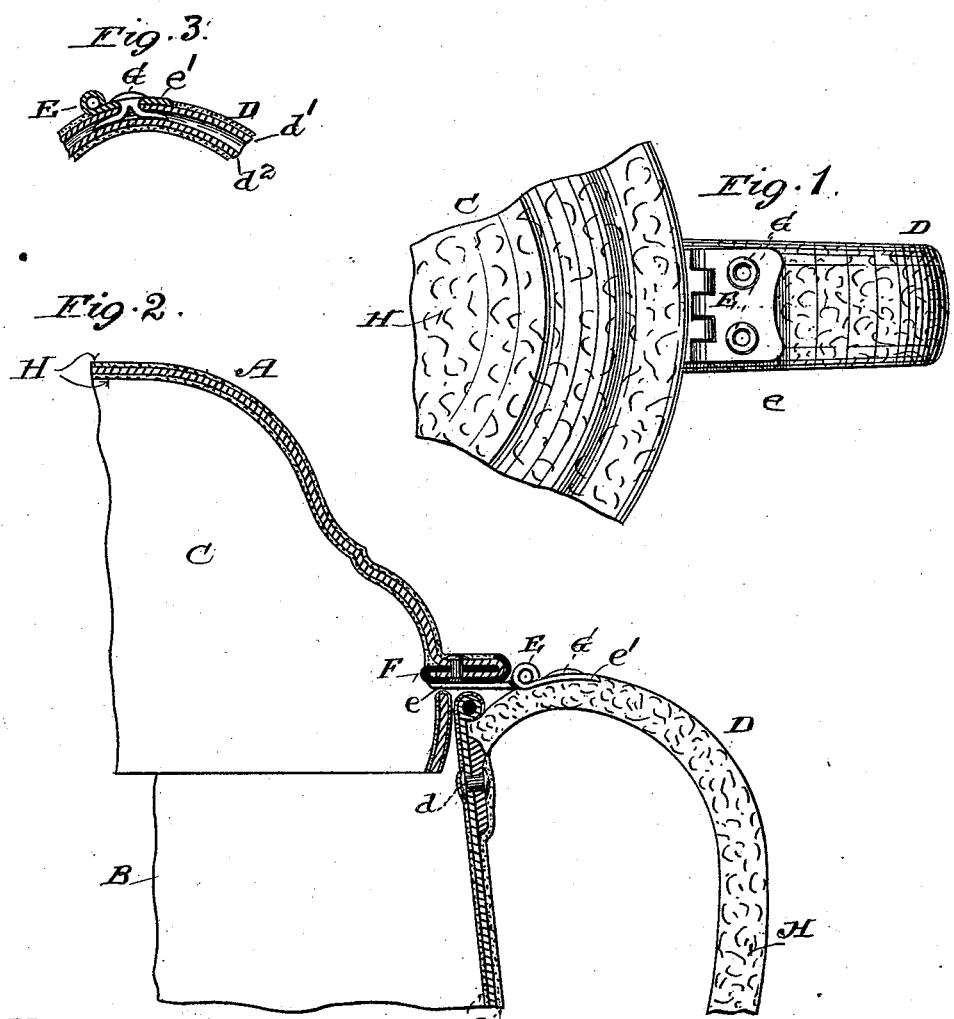

UNITED STATES PATENT OFFICE.

GEORGE W. NIEDRINGHAUS, OF ST. LOUIS, MISSOURI.

ENAMELED SHEET-METAL WARE.

SPECIFICATION forming part of Letters Patent No. 503,247, dated August 15, 1893.

Application filed March 24, 1893. Serial No. 467,486. (No model.)

*To all whom it may concern:*

Be it known that I, GEORGE W. NIEDRINGHAUS, of St. Louis, Missouri, have made a new and useful Improvement in Enameled Sheet-Metal Ware, of which the following is a full, clear, and exact description.

The improvement has relation to the mode of hinging lids and covers to vessels of enameled sheet metal ware; and more especially to such articles as tea and coffee pots, and it consists in the mode of connecting the hinge with the body-portion of the vessel, substantially as is hereinafter set forth and claimed, aided by the annexed drawings, making a part of this specification, in which—

Figure 1 is a plan of an enameled hinge; Fig. 2 a vertical section of a vessel having the hinge attached according to the principle of the improvement, and Fig. 3 a detail, being a view analogous to that of Fig. 2, and showing an improved mode of uniting the hinge and handle.

The same letters of reference denote the same parts.

The vessel, A, is of any suitable form that is adapted to receive the improvement, and it is of ordinary construction saving as modified or supplemented by the improvement under consideration.

B represents the body of the vessel, C the lid, and D the handle.

E represents the hinge.

The handle is attached to the body in any suitable manner, and the hinge can also be connected with the lid in any desirable manner. The form shown is considered quite a desirable one, the handle being attached to the body by means of the rivet $d$, and the hinge being connected with the lid by having its leaf, $e$, soldered to the under side of a plate, F, which is secured to the lid, and preferably in the manner shown in Fig. 2. But in the place of connecting the hinge with the vessel body it is attached to the vessel-handle D. The hinge-leaf, $e'$, is fastened to the handle before it is enameled, and to the upper surface thereof by means of the rivets G. After the hinge has been thus attached the vessel-body and handle receive a coating of enamel, H, shown in Figs. 1 and 2. The rivets, G, do not extend entirely through the handle, but they extend into the upper portion, $d'$, only of the handle, and the lower end of the rivet, by being driven against the lower portion, $d^2$, of the handle, may be clinched and the rivet may be split and clinched, substantially as is represented in Fig. 3. In carrying out this feature of the improvement I desire not to be restricted to ware which is enameled, nor to sheet metal, as this mode of attaching the hinge can be used upon plain ware and upon cast metal handles.

I claim—

The combination of the handle and the hinge, said hinge being attached to said handle by a rivet being passed through the hinge-leaf into the handle and clinched between the upper and lower portions thereof, substantially as described.

Witness my hand this 8th day of March, 1893.

GEO. W. NIEDRINGHAUS.

Witnesses:
C. D. MOODY,
A. BONVILLE.